(12) United States Patent
Specht et al.

(10) Patent No.: US 12,231,418 B2
(45) Date of Patent: *Feb. 18, 2025

(54) AUTHENTICATION USING SESSION-LESS LOGIN

(71) Applicant: Inductive Automation, LLC, Folsom, CA (US)

(72) Inventors: Joel Specht, Folsom, CA (US); Carl Reuben Gould, Folsom, CA (US)

(73) Assignee: Inductive Automation, LLC, Folsom, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/657,613

(22) Filed: May 7, 2024

(65) Prior Publication Data
US 2024/0297875 A1    Sep. 5, 2024

Related U.S. Application Data

(63) Continuation of application No. 18/593,566, filed on Mar. 1, 2024, now Pat. No. 12,120,102.

(60) Provisional application No. 63/487,616, filed on Mar. 1, 2023.

(51) Int. Cl.
*H04L 9/40* (2022.01)

(52) U.S. Cl.
CPC .................. *H04L 63/08* (2013.01)

(58) Field of Classification Search
CPC ...................................... H04L 63/08
USPC ........................................... 726/6
See application file for complete search history.

(56) References Cited

U.S. PATENT DOCUMENTS

2024/0098075 A1\* 3/2024 Das ................ H04L 63/08
2024/0114019 A1\* 4/2024 Olden ............. H04L 63/0815

\* cited by examiner

*Primary Examiner* — Benjamin A Kaplan
(74) *Attorney, Agent, or Firm* — Fenwick & West LLP

(57) ABSTRACT

An agent computer system uses a session-less login process to log in two users in a same application session. The system establishes an application session with an application server and a user session with the application server by authenticating a first user using an identity provider system (IdP). The system detects a request to perform an action by the first user within the application session that requires a second user's authentication. While maintaining the user session, the system requests a session-less authentication of the second user by transmitting an authentication request, which includes a flag indicating that the requested authentication is a session-less authentication. The system receives a confirmation of the authentication of the second user without establishing a second user session and performs the requested action in response to receiving the confirmation of the authentication of the second user.

20 Claims, 5 Drawing Sheets

FIG. 3    Session-less Login 350

AUTHENTICATION USING SESSION-LESS LOGIN

CROSS-REFERENCE TO RELATED APPLICATIONS

This application is a continuation of U.S. application Ser. No. 18/593,566, filed Mar. 1, 2024, which application claims a benefit of U.S. Provisional Application No. 63/487,616, filed Mar. 1, 2023, all of which are incorporated by reference herein in their entirety.

BACKGROUND

Field of Art

This disclosure relates generally to user authentication, and in particular to user authentication on applications via identity providers.

Description of Art

Applications, such as mobile applications, can be developed to include, or "wrap," an embedded web browser (i.e., a "web view") for interfacing with web service providers, such as a mobile application corresponding to a particular web application. Developing applications that use web views enables application developers to save time and resources by reusing existing functionality of a web service provider while also gaining access to native functionality. For example, an application on a mobile device can include a web view that accesses existing features of a web application and also accesses native features of the mobile device, e.g., scanning bar codes using a camera of the mobile device.

Furthermore, many web service providers provide greater flexibility for users by enabling user authentication via multiple possible third-party identity providers (IdPs), such as Facebook, Google, Salesforce, etc. By interfacing with such web service providers via a web view of an application, application developers can enable users of the application to authenticate through the same IdPs without development of custom native software to facilitate authentication with each IdP.

The process of using IdP authentication with a web service via a web view of an application generates credentials, such as cookies, which are sent to the browser as part of the authentication response. A cookie is typically a small piece of data consisting of key-value pairs, including information such as the session identifier and expiration time. The cookie is securely transmitted over HTTPS to prevent interception or tampering by unauthorized entities. When a second user attempts to log in using the same browser or device, the application and IdP may recognize the second user's request as a separate authentication attempt. Since the session credentials stored in the browser's cookie are tied to the first user's session, the second user's authentication attempt generates a new session credential distinct from the first user's credential. As a result, the second user is unable to access the first user's application session.

However, in some cases, an action may require electronic signatures from one or more users without logging out from the existing session. A common scenario is validating that one or more people are present (without logging out and back in for each user), before proceeding to the next step in a production workflow or aborting a workflow altogether. In one example, a plant-floor operator will attempt to initiate some action which requires a supervisor's approval. The supervisor digitally authenticates themselves as a part of the workflow and approves the action initiated by the plant-floor operator by providing their signature. With the current authentication protocol, the supervisor may not join the application session and approve the action without logging out the first user. In some cases, logging out the first user will end the application session.

SUMMARY

An agent computer system uses a session-less login process to log in two users in a same application session. The system establishes an application session with an application server and a user session with the application server by authenticating a first user using an identity provider system (IdP). The system detects a request to perform an action by the first user within the application session that requires a second user's authentication. While maintaining the user session, the system requests a session-less authentication of the second user by transmitting an authentication request, which includes a flag indicating that the requested authentication is a session-less authentication. The system receives a confirmation of the authentication of the second user without establishing a second user session and performs the requested action in response to receiving the confirmation of the authentication of the second user.

The features and advantages described in this summary and the following detailed description are not all-inclusive. Many additional features and advantages will be apparent to one of ordinary skill in the art in view of the drawings, specification, and claims hereof.

The figures depict an embodiment of the invention for purposes of illustration only. One skilled in the art will readily recognize from the following description that alternative embodiments of the structures and methods illustrated herein may be employed without departing from the principles of the invention described herein.

DETAILED DESCRIPTION

System Environment

Figure 1:
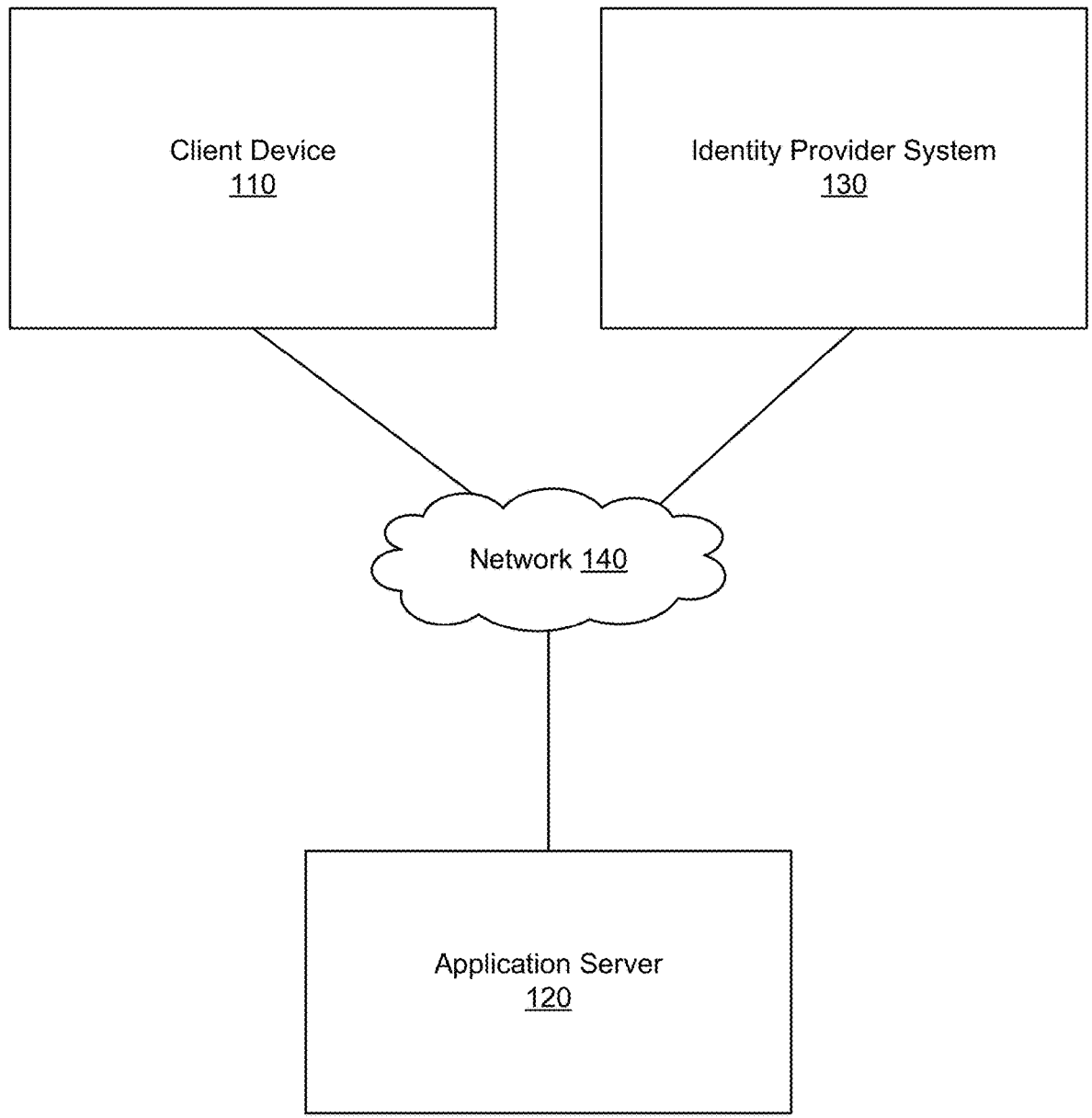
FIG. 1 is a high-level block diagram of a system environment for a client device including an application associated with a service provider system, in accordance with some embodiments.

FIG. 1 is a high-level block diagram of a system environment for a client device 110 including an application associated with an application server 120, in accordance with an embodiment. The system environment shown in FIG. 1 includes the client device 110, the application server 120, an identity provider (IdP) system 130, and a network 140. For clarity, only one client device 110, one application server 120, and one IdP system 130 are shown in FIG. 1.

Alternate embodiments of the system environment can have any number of client devices 110, service provider systems 120, or IdP systems 130. Additionally, the relative configurations of the client device 110, the application server 120, and the IdP system 130 may vary in different embodiments. The function performed by the various entities of FIG. 1 may also vary in different embodiments. As one example of an alternate embodiment, the client device 110 and the application server 120 may be modules of the same machine.

The client device 110 is a computing device including an application that communicates with the service provider 120 via the network 140. In some embodiments, the client device 110 may be referred to an agent computer system or a user agent that is operated by a user. For instance, the client device 110 can be a desktop computer, a laptop computer, a mobile device (e.g., a mobile phone, a tablet, etc.), or any other suitable device. In some embodiments, the application wraps an embedded web browser (i.e., a "web view") for interfacing with services of the service provider 120, such as interfacing with one or more web applications of the service provider 120. The client device 110 also includes one or more system web browsers, such as Safari™, Google Chrome™, Microsoft Edge™, etc. As will be described in greater detail below with reference to FIGS. 2-5, the application enables users of the client device 110 to securely authenticate with the service provider 120 via one or more IdPs (e.g., the IdP system 130) using one of the one or more system browsers of the client device 110.

The application server 120 provides web services to client computing devices (e.g., the computing device 110) via the network 140. The application server 120 may provide various web services, such as one or more web applications or cloud computing services. In some embodiments, the application server 120 provides web services for monitoring and interacting with local or remote industrial systems and processes. Conventional modules such as web servers, network interfaces, security functions, failover servers, management and network operations consoles, and the like are not shown for the application server 120 so as to not obscure the details of the system architecture; however, embodiments may include such conventional modules.

Additionally, the service provider system 120 and its components (e.g., the gateways 128) may include more, fewer, or different modules or data stores than those shown in FIG. 1, and the functions can be distributed among the modules and data stores in a different manner than is shown in FIG. 1.

In the same or different embodiments, the IdP system 130 is a third-party provider of authentication services. Although the IdP system 130 is depicted separately from the application server 120, in some embodiments the IdP system 130 is a component of the application server 120. In other embodiments, the IdP system 130 is a third-party provider of authentication services. For example, the IdP system 130 can be a software application or service with an established user-base, such as Facebook™, Google™, or Salesforce™. In embodiments described herein, the IdP system 130 authenticates authentication requests for users of client computing devices of the application server 120. After authenticating the authentication requests, the IdP system 130 provides authentication responses that describe results of the authentication, e.g., whether or not a user was successfully authenticated. For example, the IdP 130 may provide authentication responses directly to the application server 120 via an authentication callback handler. The IdP system 130 may use one or more authentication communication protocols, such as an OpenID Connect (OIDC) protocol or a security assertion markup language (SAML) protocol. If the IdP system 130 uses SAML 2.0 for authentication, communication between the IdP system 130 and the server provider system 120 may be facilitated by one or more SAML 2.0 HTTP bindings, such as an HTTP Redirect binding, or an HTTP POST binding.

The network 140 may comprise any combination of local area or wide area networks, using wired and/or wireless communication systems. In one embodiment, the network 140 uses standard communications technologies and/or protocols. For example, the network 140 includes communication links using technologies such as Ethernet, 802.11 (WiFi), worldwide interoperability for microwave access (WiMAX), cellular networks (e.g., 3G, 4G, 5G), code division multiple access (CDMA), digital subscriber line (DSL), Bluetooth, Near Field Communication (NFC), Universal Serial Bus (USB), or any combination of communication protocols (e.g., TCP/IP, HTTP, S1v1TP, FTP), encodings or formats (e.g., HTML, JSON, XML), or protection schemes (e.g., VPN, secure HTTP, SSL). In some embodiments, all or some of the communication links of the network 140 may be encrypted using any suitable technique or techniques.

Figure 2:
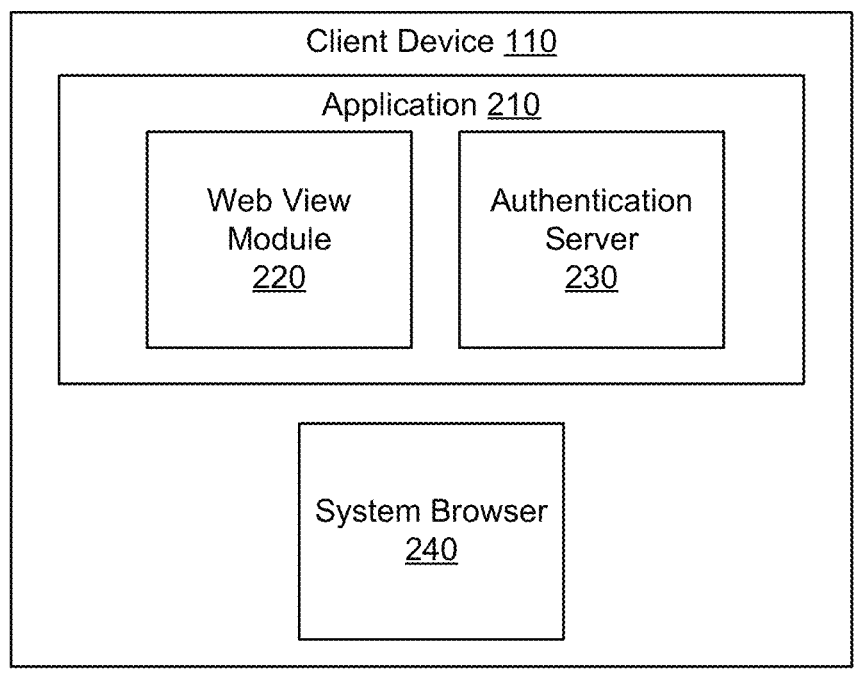
FIG. 2 is a high-level block diagram of a client device architecture, in accordance with some embodiments.

FIG. 2 is a high-level block diagram of the client device 110 architecture, in accordance with some embodiments. In the embodiment shown in FIG. 2, the client device 110 includes an application 210 and a system browser 240. Additionally, the client device 110 may include more, fewer, or different components than those shown in FIG. 2, and the functions can be distributed among the modules in a different manner than is shown in FIG. 2. For example, in some embodiments, the session-less login methodology described herein may be implemented by a client device 110 with an application 210 and a system browser 240 (e.g., without requiring a web view module 220 or an authentication server 230, and likewise without requiring an application server 120 or an identity provider system 130).

The application 210 may be an application that is a software application configured for execution by a native operating system of the client device 110. For instance, the application 210 may be an iOS application, an Android application, a Microsoft Windows application, a macOS application, or any other suitable application configured for a particular operating system environment. In the embodiment shown in FIG. 2, the application 210 includes a web view module 220 and an authentication server 230. The application 210 provides a native interface for accessing services provided by the application server 120, such as one or more web applications of the service provider 120. In the example embodiment shown in FIG. 2, the application 210 includes a web view module 220 and an authentication server 230. As will be described in greater detail below, the application 210 facilitates one or more authentication processes for authentication of a user of the client device 110 with the application server 120. In the example embodiment of FIG. 2, the application 210 facilitates authentication of the user by the IdP system 130 using the web view module 220 and the authentication server 230. The application may further be configured for single sign-on (SSO), such that the user does not always re-authenticate with the application server 120 to access relevant services through the application 210. Various additional embodiments of session-less authentication using the application 210 and the system browser 240 are further described in greater detail below with reference to FIGS. 3-4.

In the embodiment of FIG. 2, the web view module 220 manages a web view wrapped by the application 210. For example, the web view module 220 may be an "Android WebView" or an "iOS WKWebView." Using the wrapped web view, the web view module 220 provides an interface for using services of the application server 120. Further, in order to the access services of the application server 120, the web view module 220 requests authentication of the user of the client device 110 through the application server 120. For example, the web view module 220 may access or display an interface of the application server 120 for a user to select from one or more authentication processes.

If the web view module 220 requests authentication by the IdP system 130, the web view module 220 receives a redirect request from the application server 120. The redirect request is configured to direct a web browser to a redirect uniform resource locator (URL) directed the application server 120, and additionally includes an IdP URL identifying an interface of the IdP system 130. For example, the IdP URL may be a query parameter of the redirect URL. Although the term URL is used herein, one skilled in the art will appreciate that various different uniform resource identifiers (URIs) may be used where appropriate. Before forwarding the redirect request to the system browser 240, the web view module 220 modifies the redirect request. In particular, the web view module 220 modifies the redirect request to include a port of the authentication server 230. For instance, the authentication server 230 may add the authentication server 230 port a query parameter of the redirect URL. The web view module 220 may further modify the IdP URL in the redirect request to be directed to the authentication server 230 in order for the system browser 240 to retrieve an IdP authentication request from the authentication server 230, as described in further detail below with reference to the authentication server 230, for instance, by replacing the scheme, hostname, and port of the IdP URL with that of the authentication server 230. After modifying the redirect request, the web view module 220 forwards the modified redirect request to the system browser 240, which facilitates secure authentication of the user by the IdP system 130. Once the user has authenticated with the IdP system 130 through the system browser 240, the web view module 220 receives an IdP authentication response generated by the IdP system 130. The web view module 220 forwards the IdP authentication response to the application server 120 to complete the authentication process and, if the user was successfully authenticated, access services of the application server 120.

The authentication server 230 may be an embedded server of the application 210. For instance, the authentication server 230 may be an embedded HTTP server. The authentication server 230 is configured to authenticate or verify the identity or credentials of a user. The authentication server 230 provides a channel for the system browser 240 to communicate with the application 210. In some embodiments, the secure authentication process of the application 210 is configured to be agnostic relative to a particular computing environment of the application 210. In this case, the authentication server 230 may open a communication channel on a local network of the client device 110 through which the system browser 240 can communicate with the authentication server 230, e.g., using a localhost IP address. The authentication server 230 may further open the communication channel on the local network for each authentication attempt using an ephemeral port. Among other advantages, using a local network to communicate with the system browser 240 enables the secure authentication process of the application 210 to be agnostic of any a particular computing environment of the application 210. For instance, the user of the client device does not need to install trusted certificates for the client device 110 that enable authentication server 230 to establish a trusted communication channel with the system browser 240 (e.g., using transport layer security (TLS) or secure sockets layer (SSL) protocols).

Although the authentication server 230 is depicted in FIG. 2 as a component of the client device 120, in some embodiments the authentication server 230 is initialized for a particular authentication attempt (e.g., by the web view module 220 or another component of the application 210) and is shut down after the particular authentication attempt is completed. For example, the application 210 may initialize the authentication server 230 after the redirect request is received from the application server 120.

The system browser 240 may be a standalone web browser application. The system browser 240 facilitates communication between the application 210, the application server 120, and the IdP system 130 for authenticating a user of the client device 110 with the IdP system 130. Among other advantages, using the system browser 240 for user authentication ensures compliance with security requirements of certain IdPs that prevent authentication via web views wrapped by an application.

In some embodiments, the client device 110 provides a session-less login process to facilitate simultaneous login or authentication of two users within a single application session. Upon initiating communication with the application server 120, the authentication server 230 may enable the establishment of an application session and/or a corresponding user session with the application server 120 by verifying the identity of a first user via the IdP system 130. Subsequently, upon detecting a request for an action necessitating authentication from a second user within the ongoing application session, the application server 120, while preserving the existing user session, initiates a session-less authentication process for the second user. This process involves transmitting an authentication request to the IdP system 130, including a flag indicating the authentication as session-less. When the IdP system 130 receives the authentication request for the second user, the IdP system 130 parses the request and identifies the authentication request is a session-less authentication request based on the flag. The IdP system 130 may then discard/ignore any credentials in the request, e.g., application session cookies, user session cookies, and/or IdP session cookies associated with the first user's login of the application. The IdP system 130 may only verify the second user's credentials without creating a new application session, a user application, and/or a IdP session for the second user. In this way, the first user's session may be maintained without being forced to log out. Upon receipt of confirmation regarding the authentication of the second user, the application server 230 may join the second user to the application session of the first user, and the client device 110 may promptly execute the requested action within the application session. It should be noted herein that "joining" an application session can refer to a second user performing an action within the context of a first user's application session (for instance, approving an action taken or requested by the first user within the application session), without establishing a second application session associated with the second user.

Processes for Session-Less Login

Figure 3:
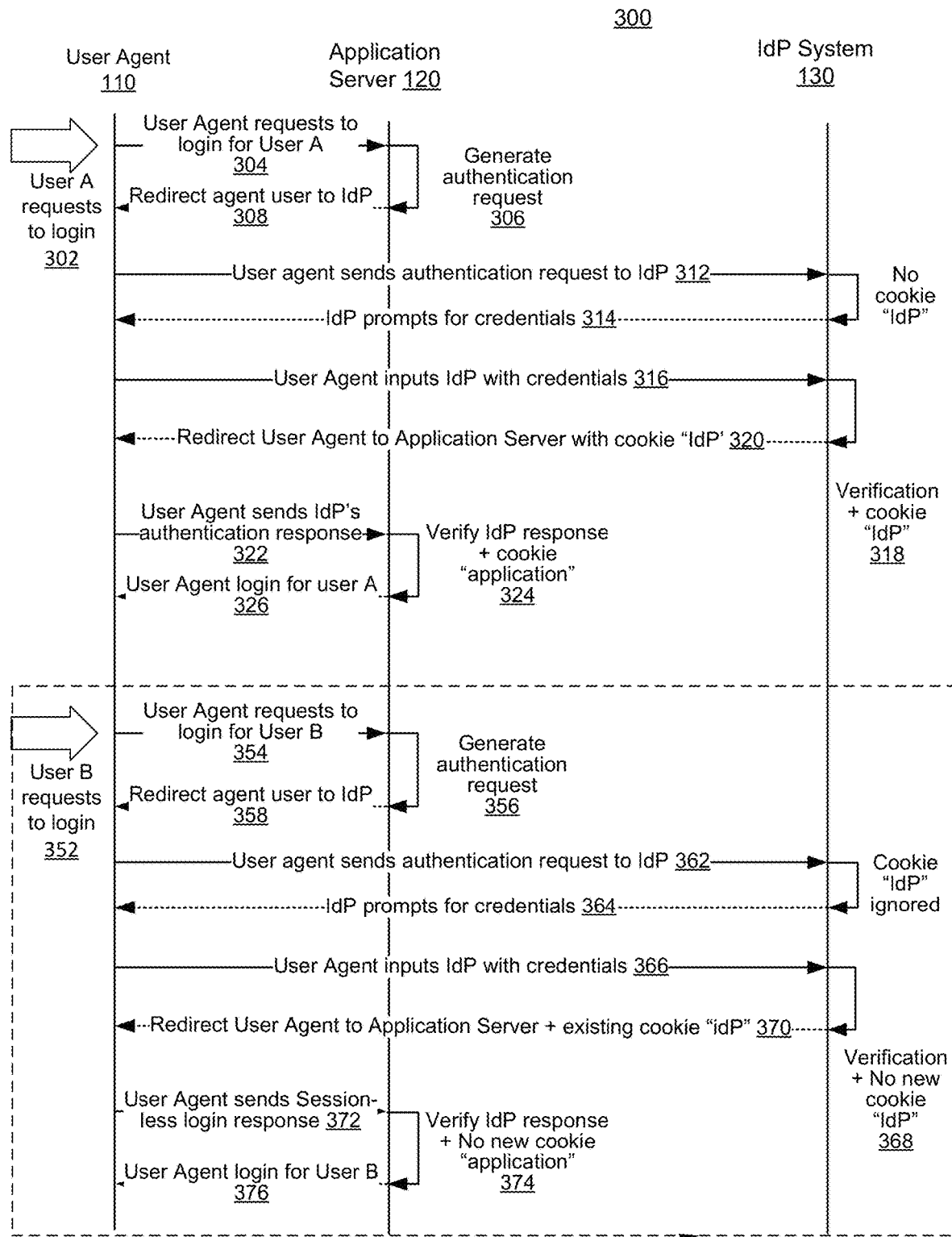
FIG. 3 illustrates an embodiment of a session-less login process, in accordance with some embodiments.

FIG. 3 illustrates an embodiment of a session-less login process 300, in accordance with some embodiments. In the embodiment shown, the sequence of interactions 300 begins with a first user, e.g., User A, initiates 302 a login request through a user agent 110 (e.g., a client device 110). An application 210 in the user agent requests 304 access to a service of the application server 120. For example, the user of the application 210 may select an option to login to the application server 120 using the IdP system 130. In some embodiments, the application 210 may be a web application. User A may interact with the application server 120 via a web view of the application 210, as described above with reference to FIG. 2.

Based on the request to access a service, the application server 120 generates 306 an authentication request and a redirect request. The redirect request may redirect the user agent to the IdP system 130. For instance, the redirect request may include the IdP URL as a query parameter of a redirect URL. The redirect request has a callback URL that directs back to the application server 120.

After generating 306 the authentication request, the application server 120 transmits 308 the redirect request to the application 210. The application 210 modifies the transmitted redirect request and forwards the modified redirect request to the system browser 240. In some implementations, the application 210 may modify the IdP URL to be directed to the authentication sever 230 and to add a port of the authentication server 230 to the redirect request. The application 210 may determine that the IdP URL should be modified to be directed to the authentication server 230 responsive to identifying an indicator in the redirect request that an HTTP POST request will be used by the IdP system 130.

The application 210 in the user agent may send 312 an authentication request to the IdP system 130 for login. The IdP system 130 receives the authentication request. At this point, there is no IdP cookie in the request that records User A's login with the IdP system 130, since this is the first time that User A logs into the IdP application. The IdP system 130 returns IdP login page and prompts 314 the user agent for credentials, consent, or other requested information for authentication. In some embodiments, the system browser 240 of the client device 110 may facilitate the authentication of the user through the IdP system 130. For example, the system browser 240 may display an authentication interface (e.g., login page) of the IdP system 130 corresponding to the IdP URL on a display of the client device 110. User A may submit credential to login to the IdP system 130. The user agent 110 then transmits 316 authentication credentials to the IdP system 130 on behalf of User A. The credentials may be a user identifier, password, authentication factor, or any other suitable authentication credential. The IdP system 130 verifies 318 the credentials input by User A and creates a new IdP session. The new IdP session is tracked by Cookie "IdP" associated with User A's login. The IdP system 130 redirects 320 the user agent to application server 120 with the IdP's authentication response including Cookie "IdP."

In some embodiments, once the credentials input by User A is successfully verified by the IdP system 130, the IdP system 130 may generate the Cookie "IdP," which is a unique session identifier or token. This Cookie "IdP" is cryptographically secured to prevent tampering or unauthorized access. In some implementations, Cookie "IdP" may include information such as a user's identity, expiration time, and any relevant access permissions or attributes associated with the user's account. In some implementations, the IdP system 130 may establish a session context to manage the user's interactions with the application 210. This context includes maintaining session state information, such as user preferences, authentication status, and activity history. The session context allows the application 210 to track the user's activities across multiple requests and ensure a consistent user experience.

The user agent submits 322 the authentication response received from the IdP system 130 to the application server 120. The application server 120 verifies 324 the IdP authentication response in order to provide the application 210 access to the service of application server 120 if the IdP authentication response indicates User A was successfully authenticated. The application server 120 also generate a cookie, e.g., Cookie "Application," recording User A's login session with the application, i.e., an application session. The user agent then logs 326 into the application on behalf of User A. The user agent may set the application session cookie, e.g., Cookie "Application" with the system browser 240 for recording User A's application session and returns application content protected behind login. In some embodiments, the application session cookie, e.g., Cookie "Application," may be stored locally on the user agent. For example, the system browser 240 may manage the storage and maintenance of cookies. The cookie is associated with the domain of the application 210 and/or the IdP system 130, allowing subsequent requests to be associated with the same application session. During subsequent interactions with the application 120, the system browser 240 automatically includes the Cookie "Application" in the HTTP request headers. This allows the application server 120 to identify the User A's session and maintain continuity across multiple requests. Once the user agent successfully logs into the application 210, the user agent may display the application content to User A on a display of the user agent.

In some implementations, User A may request a second user, e.g., User B, to log into the same application session to approve an action in the system browser 240. However, in conventional solutions, when a second user attempts to log in using the same browser or device, the first user is required to sign out of or otherwise end the first user's application session. This is primarily because the session cookie stored in the browser's cookie is specific to the first user's user session and cannot be easily shared or transferred between users. The second user's authentication attempt may generate a new user session cookie, distinct from the one associated with the first user's user session, thus forcing the first user to log out the session.

To address the deficiencies of conventional solutions, the second user, e.g., User B, may instead initiate a session-less login process 350. As shown in FIG. 3, User B may send 352 a session-less login request through the user agent 110. The user agent requests 354 a session-less login on behalf of User B to the application server 120. The application server 120 generates 356 an authentication request and a redirect request. The redirect request may redirect the user agent to the IdP system 130. The application server 120 transmits 358 the redirect request to the application 210. The application 210 sends 362 a session-less login request to the IdP system 130 on behalf of User B. The session-less login request includes one or more parameters that function as a flag or identifier indicating that the login request is for a session-less login. At this point, there exists a session cookie, Cookie "IdP," which is associated with User A's login session. The IdP system 130 receives the session-less login request and parses the request to determine the request is associated with a session-less login based on the flag/indicator. In this way, even though User A's IdP session cookie is included in the request, the IdP system 130 ignores the session cookie and treats User B's login request as a "first-time" login request. The IdP system 130 returns IdP login page and prompts 364 the user agent for credentials, consent, or other requested information for authentication. In some embodiments, the system browser 240 may display an authentication interface (e.g., login page) of the IdP system 130 corresponding to the IdP URL on a display of the client device 110. User B may submit credentials to log in to the IdP system 130. The user agent 110 then transmits 366 authentication credentials to the IdP system 130 on behalf of User B. The IdP system 130 verifies 368 the credentials input by User B, but does not create new cookies for User B's session due to the sessionless login request. The existing Cookie "IdP" is not affected. The IdP system 130 redirects 370 the user agent to application server 120 with the IdP's authentication response without additional cookies.

The user agent submits 372 the session-less login response received from the IdP system 130 to the application server 120. The application server 120 verifies 374 the IdP session-less login response if the IdP session-less login response indicates User B was successfully authenticated. The application server 120 does not generate new cookies due to the session-less login. The existing Cookie "Application" associated with User A's login is not affected, and User A's login session is not affected by User B's login. The application server 120 returns 376 results of performing the action that is initiated by User A and approved by User B. The user agent may display the result via system browser 240.

Method of Session-Less Login

Figure 4:
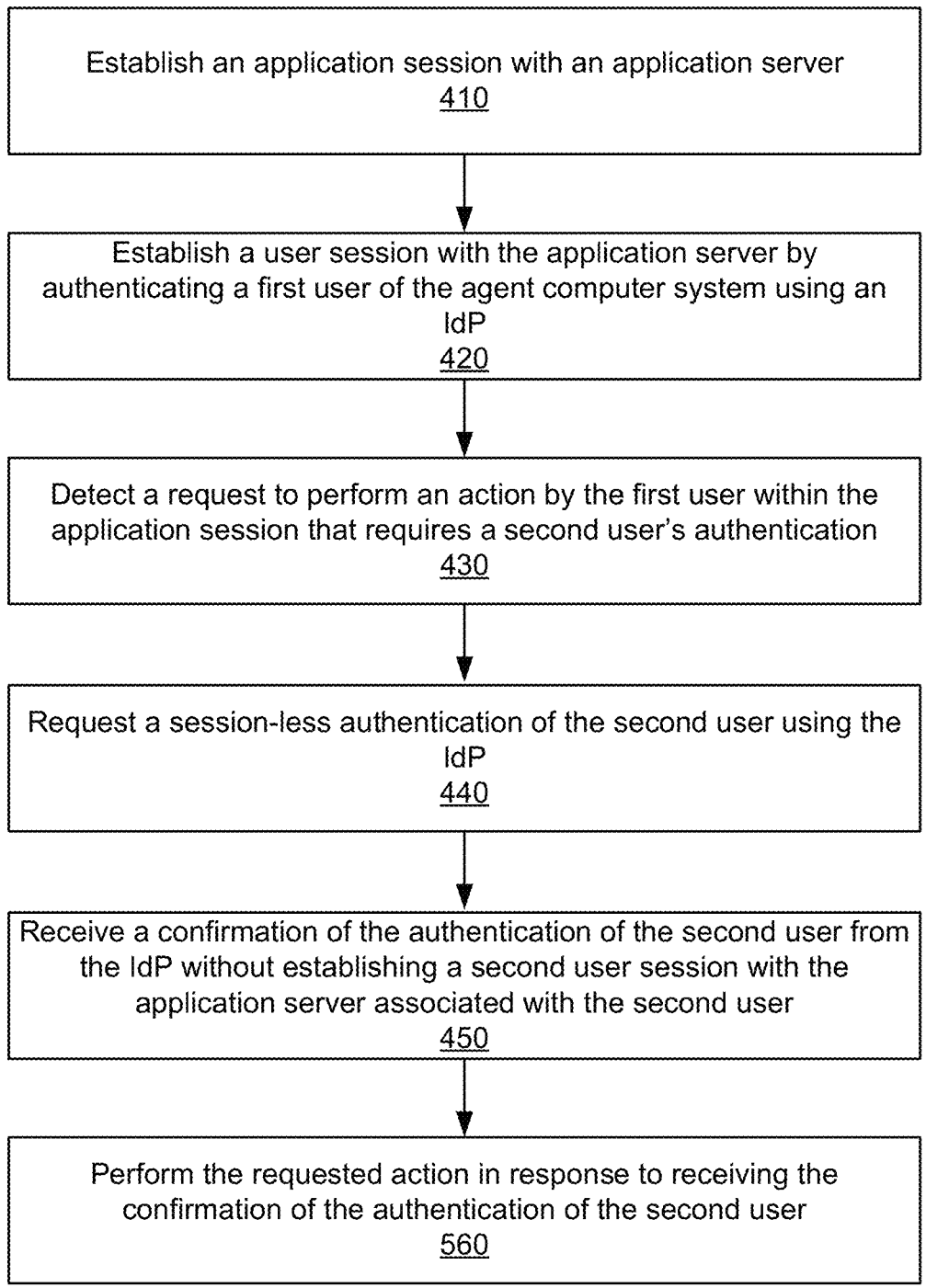
FIG. 4 is a flowchart illustrating an embodiment of a session-less login process through an IdP for accessing a web service.

FIG. 4 is a flowchart illustrating an embodiment of a session-less login process 400 through an IdP for accessing a web service. In the embodiment shown, the steps of the process 400 are performed by certain components of a computing device (e.g., the client device 110). In other embodiments, the steps of the process 400 may be accomplished by other suitable components, e.g., of the computer environment 100, that those depicted in FIG. 4 and described below.

The process 400 includes an agent computer system establishing 410 an application session with an application server. In some embodiments, establishing an application session with an application server may require authentication of a user of the application. The authentication may generate one or more credentials for recording/identifying the application session.

The process 400 includes the agent computer system establishing 420 a user session with the application server by authenticating a first user of the agent computer system using an identity provider system. In some embodiments, establishing the user session with the application server may include receiving one or more credentials generated by the identity provider system for granting the first user access to the user session with the application server. In some implementations, the credentials may include one or more cookies for recording the user session. The cookies may be stored in a web browser of the agent computer system.

The process 400 includes the agent computer system detecting 430 a request to perform an action by the first user within the application session that requires a second user's authentication.

The process 400 includes the agent computer system requesting 440 a session-less authentication of the second user using the identity provider system, while maintaining the user session with the application server. Requesting the session-less authentication may include transmitting an authentication request including a flag indicating that the requested authentication is a session-less authentication. In some embodiments, the flag may cause the identity provider system to ignore the user session. In some embodiments, the authentication request includes credentials associated with the second user and without credentials associated with the first user of the user session. In some embodiments, while maintaining the user session with the application server, the process 400 allows the second user to join the application session without ending or pausing the user session. In one implementation, the process 400 may allow the second user to join the application session without overwriting credentials associated with the user session maintained by the agent computer system. In another implementation, the process 400 may allow the second user to join the application session without deleting cookies stored by the agent computer system that include authentication information or user session information associated with the first user.

The process 400 includes the agent computer system receiving 450 a confirmation of the authentication of the second user from the identity provider system without establishing a second user session with the application server associated with the second user.

The process 400 includes the agent computer system performing 460 the requested action in response to receiving the confirmation of the authentication of the second user.

Figure 5:
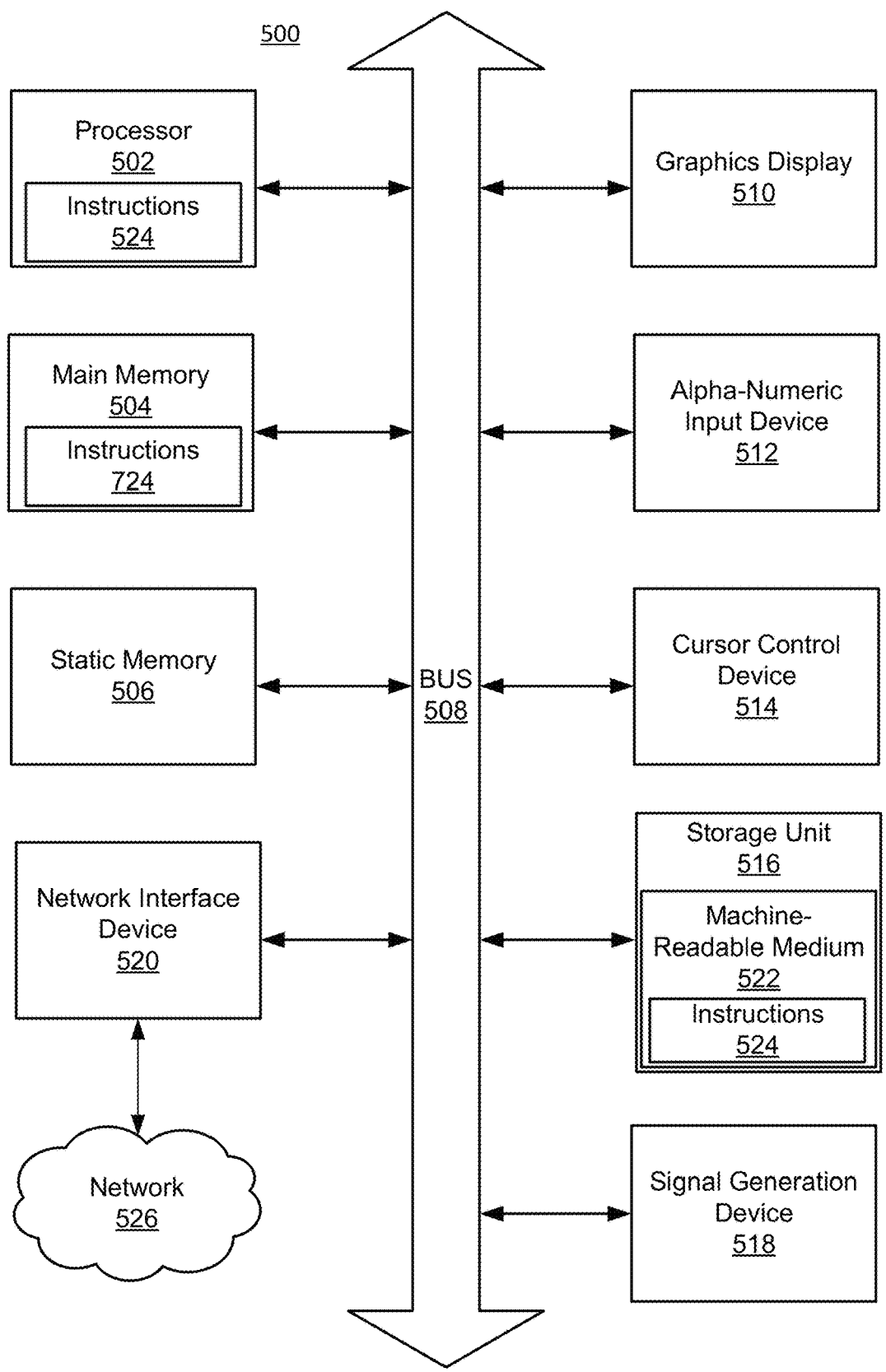
FIG. 5 is a block diagram illustrating components of an example machine able to read instructions from a machine-readable medium and execute the instructions in one or more processors, in accordance with some embodiments.

FIG. 5 is a block diagram illustrating components of an example machine able to read instructions from a machine-readable medium and execute them in one or more processors (or controllers). Specifically, FIG. 5 shows a diagrammatic representation of one or more computing devices of the system environment 100. The computer system 500 can be used to execute instructions 524 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processing units (generally processor 502). The processor 502 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 500 also includes a main memory 504. The computer system may include a storage unit 516. The processor 502, memory 504, and the storage unit 516 communicate via a bus 508.

In addition, the computer system 500 can include a static memory 506, a graphics display 510 (e.g., to drive a plasma display panel (PDP), a liquid crystal display (LCD), or a projector). The computer system 500 may also include alphanumeric input device 512 (e.g., a keyboard), a cursor control device 514 (e.g., a mouse, a trackball, a joystick, a motion sensor, or other pointing instrument), a signal generation device 518 (e.g., a speaker), and a network interface device 520, which also are configured to communicate via the bus 508. In some embodiments, the computer system 500 may include cell phone or smartphone hardware, such as a camera, motion sensor, accelerometer, scanner (or QR code reader), global positioning system (GPS) functionalities and geolocation abilities, near field communication, etc.

The storage unit 616 includes a machine-readable medium 522 on which is stored instructions 524 (e.g., software) embodying any one or more of the methodologies or functions described herein. For example, the instructions 524 may include instructions for implementing the functionalities of the client device 110 or the application server 120. The instructions 524 may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store the instructions 524. The term "machine-readable medium" shall also be taken to include any medium that is capable of storing instructions 524 for execution by the machine and that cause the machine to perform any one or more of the methodologies disclosed herein. The term "machine-readable medium" includes, but not be limited to, data repositories in the form of solid-state memories, optical media, and magnetic media.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise. Where values are described as "approximate" or "substantially" (or their derivatives), such values should be construed as accurate +/−10% unless another meaning is apparent from the context. From example, "approximately ten" should be understood to mean "in a range from nine to eleven."

Upon reading this disclosure, those of skill in the art will appreciate still additional alternative structural and functional designs for a system and a process for verifying an account with an on-line service provider corresponds to a genuine business. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by any claims that issue.

What is claimed is:

1. A method comprising:
    establishing, by an agent computer system, an application session with an application server;
    establishing, by the agent computer system, a user session with the application server by authenticating a first user of the agent computer system using an identity provider system;
    detecting, by the agent computer system, that the application session requires a second user's authentication;
    while maintaining the user session with the application server, requesting, by the agent computer system, a session-less authentication of the second user using the identity provider system, wherein the identity provider system is configured to ignore the user session in response to the request;
    receiving, by the agent computer system, a confirmation of the authentication of the second user from the identity provider system without establishing a second user session with the application server associated with the second user; and
    performing, by the agent computer system, the requested action in response to receiving the confirmation of the authentication of the second user.

2. The method of claim 1, wherein maintaining the user session with the application server comprises: allowing the second user to approve an action initiated by the first user within the application session without ending or pausing the user session.

3. The method of claim 1, wherein maintaining the user session with the application server comprises: allowing the second user to join the application session without overwriting credentials associated with the user session maintained by the agent computer system.

4. The method of claim 1, wherein maintaining the user session with the application server comprises: allowing the second user to join the application session without deleting cookies stored by the agent computer system that include authentication information or user session information associated with the first user.

5. The method of claim 1, wherein the authentication request includes credentials associated with the second user and without credentials associated with the first user of the user session.

6. The method of claim 1, wherein establishing the user session with the application server comprises: receiving one or more credentials generated by the identity provider system for granting the first user an access to the user session with the application server.

7. The method of claim 6, wherein the one or more credentials include a session cookie to be stored in a web browser of the agent computer system.

8. A non-transitory computer-readable storage medium storing instructions that, when executed by a processor, cause the processor to perform operations comprising:
establishing, by an agent computer system, an application session with an application server;
establishing, by the agent computer system, a user session with the application server by authenticating a first user of the agent computer system using an identity provider system;
detecting, by the agent computer system, that the application session requires a second user's authentication;
while maintaining the user session with the application server, requesting, by the agent computer system, a session-less authentication of the second user using the identity provider system, wherein the identity provider system is configured to ignore the user session in response to the request;
receiving, by the agent computer system, a confirmation of the authentication of the second user from the identity provider system without establishing a second user session with the application server associated with the second user; and
performing, by the agent computer system, the requested action in response to receiving the confirmation of the authentication of the second user.

9. The non-transitory computer-readable storage medium of claim 8, wherein maintaining the user session with the application server comprises: allowing the second user to approve an action initiated by the first user within the application session without ending or pausing the user session.

10. The non-transitory computer-readable storage medium of claim 8, wherein maintaining the user session with the application server comprises: allowing the second user to join the application session without overwriting credentials associated with the user session maintained by the agent computer system.

11. The non-transitory computer-readable storage medium of claim 8, wherein maintaining the user session with the application server comprises: allowing the second user to join the application session without deleting cookies stored by the agent computer system that include authentication information or user session information associated with the first user.

12. The non-transitory computer-readable storage medium of claim 8, wherein the authentication request includes credentials associated with the second user and without credentials associated with the first user of the user session.

13. The non-transitory computer-readable storage medium of claim 8, wherein establishing the user session with the application server comprises: receiving one or more credentials generated by the identity provider system for granting the first user an access to the user session with the application server.

14. The non-transitory computer-readable storage medium of claim 13, wherein the one or more credentials include a session cookie to be stored in a web browser of the agent computer system.

15. A system comprising:
one or more computer processors; and
one or more computer-readable mediums storing instructions that, when executed by the one or more computer processors, cause the system to:
establish an application session with an application server;
establish a user session with the application server by authenticating a first user using an identity provider system;
detect that the application session requires a second user's authentication;
while maintaining the user session with the application server, request a session-less authentication of the second user using the identity provider system, wherein the identity provider system is configured to ignore the user session in response to the request;
receive a confirmation of the authentication of the second user from the identity provider system without establishing a second user session with the application server associated with the second user; and
perform the requested action in response to receiving the confirmation of the authentication of the second user.

16. The system of claim 15, wherein maintaining the user session with the application server comprises: allowing the second user to approve an action initiated by the first user within the application session without ending or pausing the user session.

17. The system of claim 15, wherein maintaining the user session with the application server comprises: allowing the second user to join the application session without overwriting credentials associated with the user session.

18. The system of claim 15, wherein maintaining the user session with the application server comprises: allowing the second user to join the application session without deleting cookies that include authentication information or user session information associated with the first user.

19. The system of claim 15, wherein the authentication request includes credentials associated with the second user and without credentials associated with the first user of the user session.

20. The system of claim 15, wherein the instruction to establish the user session with the application server further cause the system to: receive one or more credentials generated by the identity provider system for granting the first user an access to the user session with the application server.

\* \* \* \* \*